United States Patent
Zhang

(10) Patent No.: US 10,482,304 B2
(45) Date of Patent: Nov. 19, 2019

(54) FINGERPRINT AND PALMPRINT IMAGE COLLECTOR WITH HONEYCOMB STRUCTURE, AND TERMINAL DEVICE

(71) Applicant: Vkansee Technology Company Ltd., Shenzhen, Guangdong (CN)

(72) Inventor: Mingfang Zhang, Guangdong (CN)

(73) Assignee: Vkansee Technology Company Ltd., Shenzhen, Guangdong (CN)

( * ) Notice: Subject to any disclaimer, the term of this patent is extended or adjusted under 35 U.S.C. 154(b) by 213 days.

(21) Appl. No.: 15/539,938

(22) PCT Filed: Oct. 28, 2015

(86) PCT No.: PCT/CN2015/093029
§ 371 (c)(1),
(2) Date: Jun. 26, 2017

(87) PCT Pub. No.: WO2016/119492
PCT Pub. Date: Aug. 4, 2016

(65) Prior Publication Data
US 2017/0351898 A1    Dec. 7, 2017

(30) Foreign Application Priority Data
Jan. 29, 2015   (CN) .......................... 2015 1 0046991

(51) Int. Cl.
*G06K 9/00* (2006.01)
*F21V 8/00* (2006.01)
*G06K 9/20* (2006.01)

(52) U.S. Cl.
CPC ....... *G06K 9/00013* (2013.01); *G02B 6/0016* (2013.01); *G02B 6/0021* (2013.01);
(Continued)

(58) Field of Classification Search
CPC ............ G06K 9/00013; G06K 9/0004; G06K 9/2036; G06K 9/00; G02B 6/0021; G02B 6/0016; G02B 6/0031
See application file for complete search history.

(56) References Cited

U.S. PATENT DOCUMENTS

| 5,446,290 A | 8/1995 | Fujieda et al. |
| 5,726,443 A * | 3/1998 | Immega ................ G01S 17/026 250/208.1 |

(Continued)

FOREIGN PATENT DOCUMENTS

| CN | 102048542 A | 5/2011 |
| CN | 202257604 U | 5/2012 |

(Continued)

OTHER PUBLICATIONS

Supplementary European Search Report dated Aug. 21, 2018, for European Application No. 15879690, 7 pages.

*Primary Examiner* — John B Strege
(74) *Attorney, Agent, or Firm* — Bret E. Field; Bozicevic, Field & Francis LLP

(57) ABSTRACT

A fingerprint and palmprint image collector with a honeycomb structure and a terminal device are provided. The image collector includes a light guide plate, and a light source for emitting at least part of light into the light guide plate. A surface of the light guide plate is provided with a honeycomb plate. A plurality of vias parallel to each other are densely disposed on the honeycomb plate. The diameter of each via is in a range from 0.5 micrometer to 50 micrometers, and the size of an acquired fingerprint or palmprint is equal to the size of an acquired image. The thickness of the honeycomb plate is more than five times of the diameter of the via. The distance between centers of adjacent vias is less than or equal to 50.8 micrometers. The other surface of the honeycomb plate is provided with an (Continued)

image sensor. The image collector can be integrated into the terminal device. The fingerprint and palmprint image collector with the honeycomb structure according to the invention has a compact structure and a thin thickness, and can improve the contrast of the fingerprint image and the adaptive capacity for dry and wet fingers. The fingerprint and palmprint image collector is integrated into the terminal device so that the terminal device has a fingerprint and palmprint acquisition function through fewer additional component and low cost.

10 Claims, 3 Drawing Sheets

(52) U.S. Cl.
CPC ............. *G02B 6/0031* (2013.01); *G06K 9/00* (2013.01); *G06K 9/0004* (2013.01); *G06K 9/2036* (2013.01)

(56) References Cited

U.S. PATENT DOCUMENTS

| | | | |
|---|---|---|---|
| 9,829,614 B2 * | 11/2017 | Smith | ................... G02B 27/58 |
| 2008/0121789 A1 * | 5/2008 | Augstein | .............. G06K 9/2036 |
| | | | 250/237 R |

FOREIGN PATENT DOCUMENTS

| | | |
|---|---|---|
| CN | 102609692 A | 7/2012 |
| CN | 104156105 A | 11/2014 |
| CN | 204028936 U | 12/2014 |
| CN | 204463158 U | 7/2015 |
| EP | 0886958 A2 | 12/1998 |
| JP | H06-325158 A | 11/1994 |
| JP | H11-120324 A | 4/1999 |
| JP | 2002-533848 A | 10/2002 |
| JP | 2004-310577 A | 11/2004 |
| JP | 2011-081666 A | 4/2011 |

* cited by examiner

FINGERPRINT AND PALMPRINT IMAGE COLLECTOR WITH HONEYCOMB STRUCTURE, AND TERMINAL DEVICE

This application claims the priority to Chinese Patent Application NO. 201510046991.1, titled "FINGERPRINT AND PALMPRINT IMAGE COLLECTOR WITH HONEYCOMB STRUCTURE, AND TERMINAL DEVICE", filed with the SIPO on Jan. 29, 2015, the entire contents of which are incorporated herein by reference.

FIELD OF THE PRESENT DISCLOSURE

The present disclosure relates to the field of image acquisition, and in particular, to a fingerprint and palmprint image collector with a honeycomb structure, and a terminal device including the image collector.

BACKGROUND OF THE PRESENT DISCLOSURE

Fingerprint and palmprint image collectors are currently used in a growing number of fields, such as mobile phone, tablet, television and other electronic terminals, as well as various security systems. With the development trend of ultra-thin electronic terminals, higher requirements are raised naturally for the volume, thickness of an image collector integrated in the electronic terminal and the definition of acquired images thereof, and the like.

The existing fingerprint image collector, such as a thin type optical fingerprint acquisition device disclosed in Chinese Patent Application NO. 201120403301.0, generally includes an image acquisition prism, an imaging apparatus and an image processing element. The imaging apparatus further includes a lens, a photoelectric signal conversion circuit, a digital processor and the like. A relatively long light path is required to meet the requirement for light imaging, because the image acquisition prism is used as an acquisition component for light, and the lens is required to complete the light imaging of fingerprint. The image scanner must have a relatively large volume and thickness to implement the acquisition of a fingerprint image, due to a relatively large volume and thickness of the image acquisition prism and the lens, as well as factors such as the length of light path. In addition, it is difficult for the existing image scanner to meet requirements of various electronic terminals for low cost, small volume and ultra-thinness of the image collector, due to the high cost and complex structure caused by associated components such as the image acquisition prism and the lens.

Therefore, how to reduce the thickness of the optical fingerprint acquisition apparatus becomes a technical problem to be solved.

SUMMARY OF THE PRESENT DISCLOSURE

An object of the disclosure is to provide a fingerprint and palmprint image collector with a honeycomb structure and a terminal device, which has the compact structure, thin thickness and low cost, and can improve the contrast of the fingerprint image and the adaptive capacity for dry and wet fingers.

In order to achieve the above object, a fingerprint and palmprint image collector with a honeycomb structure is provided according to the present disclosure. The fingerprint and palmprint image collector includes a light guide plate and a light source for emitting at least part of light into the light guide plate. A honeycomb plate is disposed at one surface of the light guide plate. A plurality of vias parallel to each other are densely disposed on the honeycomb plate. Diameters of the vias are in a range from 0.5 micrometer to 50 micrometers, and a size of an acquired fingerprint and palmprint is equal to a size of an acquired image. A thickness of the honeycomb plate is more than five times the diameters of the vias, and a distance between centers of adjacent vias is less than or equal to 50.8 micrometers. An image sensor is disposed on the other surface of the honeycomb plate.

Further, angles between central axes of the vias and a horizontal plane of the honeycomb plate are greater than or equal to 30 degrees and less than or equal to 90 degrees.

Further, the light source is disposed at a side and/or an upper surface and/or a lower surface of the light guide plate.

Further, the plurality of vias are disposed in an array or disposed straggly.

Further, a diffuse reflection layer is disposed on a surface of the honeycomb plate facing the light guide plate.

Further, the diffuse reflection layer is composed of a convex structure disposed between adjacent vias.

Further, the light guide plate is disposed to be spaced apart from or connected to the honeycomb plate, and the honeycomb plate is disposed to be spaced apart from or connected to the image sensor.

Further, the light source is fixed on the light guide plate via a support. The support is provided with a light guide groove. The light source is disposed in the light guide groove. The light guide groove is configured to control an angle between a normal line and light which is emitted into the light guide plate from the light source through the light guide groove to be in a range from $\arcsin(n_0/n_2)$ to $\arcsin(n_1/n_2)$, where $n_0$ is a refractive index of air, $n_1$ is a refractive index of liquid on a surface of an object contacting the light guide plate, and $n_2$ is a refractive index of the light guide plate.

Further, the honeycomb plate is replaced by an optical fiber plate. The optical fiber plate is composed of a plurality of optical fibers which are parallel to each other and disposed densely. One end of each of the optical fibers is toward the light guide plate, and the other end of each of the optical fibers is toward the image sensor.

A terminal device is provided, which includes the fingerprint and palmprint image collector with the honeycomb structure described above.

After employing the above solution, the present disclosure has the following advantages.

1. The fingerprint and palmprint image collector with the honeycomb structure, which is composed of a light guide plate, a honeycomb plate, a light source and an image sensor, has a compact structure and a thinner thickness. When a finger or a palm touches the light guide plate, the total internal reflection of light in the light guide plate is frustrated. Part of the light is projected on a surface of the finger or palm leaking from the light guide plate, to form light diffused in various angles. With the vias which are parallel to each other and densely disposed on the honeycomb plate, it is ensured that only the light in a single direction parallel to the vias can pass through the honeycomb plate, and thus stray light in multiple directions can be better shielded. The sizes of the vias are set to allow only a single light or light beam to enter the vias, and the imaging is performed only in a smaller range, such as one pixel, such that the size of an acquired fingerprint and palmprint is equal to the size of an acquired image. The light parallel to or approximately parallel to the vias is projected on the image sensor through the vias to generate an digital image signal. For the acquisition of the fingerprint or palmprint, parallel light is used to facilitate acquisition of a high-contrast image based on the valley structure of the finger or palm. That is, for parallel light in a single direction which is reflected after the finger or palm touches the light guide plate, the intensity of light reflected by a ridge of the fingerprint or the palmprint is greater than the intensity of light reflected by a valley of the fingerprint or the palmprint, and thus the image of the fingerprint or palmprint may be clearer.

2. In this disclosure, a diffuse reflection layer is disposed on a surface of the honeycomb plate close to the light guide plate. Based on such a design, the total internal reflection of light inside the light guide plate is further frustrated, thus the problem of dry finger is effectively solved, and the adaptive capability for the dry and wet fingers is improved.

3. The fingerprint and palmprint image collector with the honeycomb structure according to the disclosure is integrated into a terminal device, so that the terminal device has a fingerprint and palmprint acquisition function through fewer additional components and lower cost.

BRIEF DESCRIPTION OF THE DRAWINGS

The accompanying drawings constituting a part of this specification are used to provide a further understanding of the disclosure. The schematic embodiments of the disclosure and the description thereof are used to explain the disclosure, and are not intended to inappropriately limit the scope of the disclosure. In the drawings.

DESCRIPTION OF THE EMBODIMENTS

In the following, the embodiments of the disclosure are further described in conjunction with the drawings.

Figure 1:
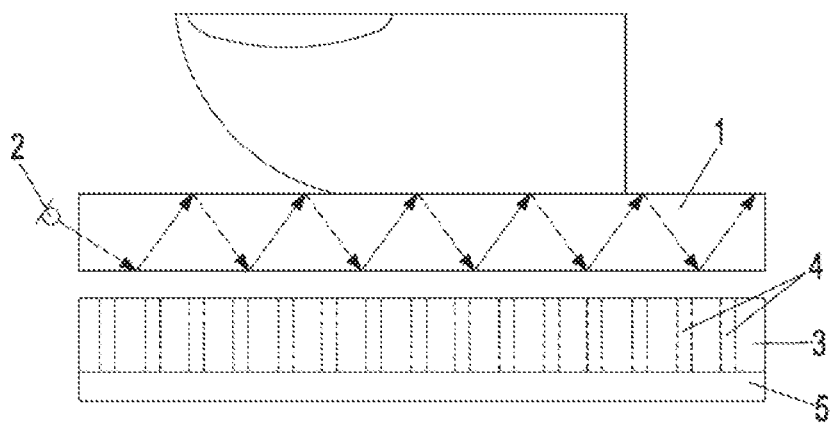
FIG. 1 is a schematic diagram of a fingerprint and palmprint image collector with a honeycomb structure according to a first embodiment of the present disclosure.

FIG. 1 shows a schematic diagram of a fingerprint and palmprint image collector with a honeycomb structure according to a first embodiment of the present disclosure. The fingerprint and palmprint image collector includes a light guide plate 1, a light source 2, a honeycomb plate 3 and an image sensor 5.

The light guide plate 1 may be selected from various materials, such as a glass plate and various transparent materials.

The light source 2 is configured for emitting at least part of light into the light guide plate 1. The light source 2 may be an LED light or other light emitting elements, which is not limited herein. The light source 2 is disposed at a side and/or an upper surface and/or a lower surface of the light guide plate 1. In this embodiment, the light source 2 is disposed at a left side of the light guide plate 1, and directly fixed on the light guide plate 1 in a bonding mode or other fixed modes.

In this embodiment, the honeycomb plate 3 is disposed below the light source 2 and spaced apart from the light source 2. A plurality of vias 4 parallel to each other are densely disposed on the honeycomb plate 3. A via 4 is generally a circular hole. An angle between a central axis of the via 4 and a horizontal plane of the honeycomb plate 3 is greater than or equal to 30 degrees and less than or equal to 90 degrees. In this embodiment, the angle is equal to 90 degrees. The diameter of the via 4 is in a range from 0.5 micrometer to 50 micrometers. Preferably, the diameter of the via 4 is greater than 1 micrometer and less than or equal to 5.8 micrometers. In this embodiment, the diameters of the plurality of vias 4 are equal to each other. Furthermore, the diameters of the plurality of vias may be not equal to each other. The vias may be disposed in an array or may also be disposed straggly, which all fall into the scope of the disclosure. In this embodiment, the sizes of the vias are set to allow only a single light or light beam to pass through the vias. Furthermore, the imaging is performed in only a small range, such as one pixel. Of course, the range may be more than one pixel. The size of an acquired fingerprint or palmprint is equal to the size of an acquired fingerprint or palmprint image. These all fall into the scope of the disclosure. The thickness of the honeycomb plate 3 is more than five times the diameter of the via 4. A distance between centers of adjacent vias 4 is less than or equal to 50.8 micrometers. In this embodiment, the distance is selected to be 50.8 micrometers, and thus an image collector with such vias 4 densely disposed may meet the requirement for resolution 500 PPI. When the distance between centers of adjacent vias 4 is selected to be 25.4 micrometers, the image collector may meet the requirement for resolution 1000 PPI. When the distance between centers of adjacent vias 4 is selected to be 12.7 micrometers, the image collector may meet the requirement for resolution 2000 PPI.

The image sensor 5 includes a CMOS or CCD image sensor. In this embodiment, the image sensor 5 is fixed on the lower surface of the honeycomb plate 3 in a bonding or threaded connection mode.

In use, the light guide plate 1 is touched by a finger or palm. When no finger or palm is touching the light guide plate 1, the light emitted from the light source 2 enters the light guide plate 1, and at least part of the light in the light guide plate 1 propagates by total internal reflection. When a finger or palm is touching the upper surface of the light guide plate 1, because of the refractive index of the surface of the finger or palm is different from that of air (there is secretion on the surface of the finger or palm which has a refractive index similar to that of the water), thus the total internal reflection of the light in the light guide plate 1 is frustrated. Part of the light is projected onto the surface of the finger or palm leaking from the light guide plate 1, to form light diffused in various angles. With the vias 4 which are parallel to each other and densely disposed on the honeycomb plate 3, it is ensured that only the light in a single direction parallel to the via 4 can pass through the honeycomb plate 3, and thus stray light in multiple directions can be better shielded. The sizes of the vias 4 are set to allow only a single light or light beam to enter the vias, so that the acquired fingerprint and palmprint being detected is imaged in only one pixel, and the size of the acquired fingerprint and palmprint (that is, the size of an object) is equal to the size of the acquired image of the fingerprint and palmprint (that is, the size of an image). That is to say, the fingerprint or palmprint is regarded to be composed of a plurality of dense object points (the size of one object point is equal to the size of one pixel), the object points are transmitted by means of light parallel to respective vias 4, and an optical signal is transmitted to the image sensor 5. For the acquisition of the fingerprint or palmprint, parallel light is used to facilitate acquisition of a high-contrast image based on the valley structure of the finger or palm. That is, for parallel light in a single direction which is reflected after the finger or palm touches the light guide plate 1, the intensity of light reflected by a ridge of the fingerprint or the palmprint is greater than the intensity of light reflected by a valley of the fingerprint or the palmprint, and thus the contrast of an obtained fingerprint or palmprint image is improved. Thus, the image of the fingerprint or palmprint may be clearer.

In this disclosure, a parallel light imaging principle is used to ensure that a small enough object can be acquired and an image equal in size to the object can be obtained when the object is irradiated by parallel light.

Figure 2:
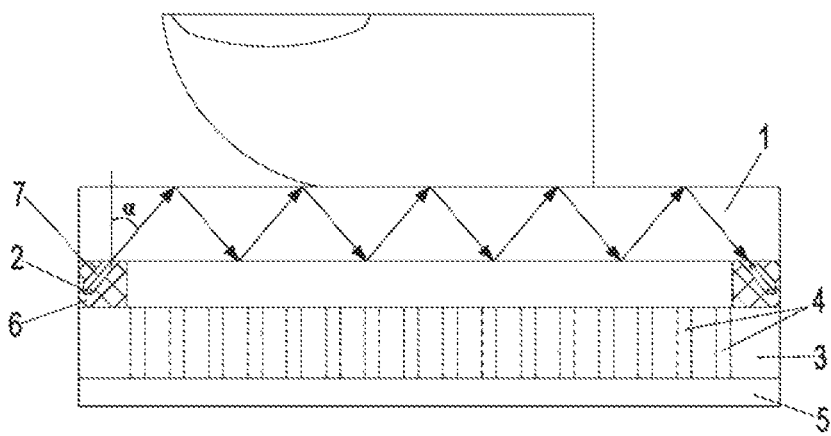
FIG. 2 is a schematic diagram of an image collector according to a second embodiment of the present disclosure.

FIG. 2 shows a schematic diagram of a fingerprint and palmprint image collector with a honeycomb structure according to a second embodiment of the present disclosure, and most of the structure thereof is the same as that in the embodiment shown in FIG. 1. The difference is that, the number of the light sources 2 is two, and the two light sources are fixed on both ends of the lower surface of the light guide plate 1 through supports 6 respectively. A light guide groove 7 is disposed on the upper surface of each of the supports 6. The two light sources 2 are disposed inside two light guide grooves 7 respectively. The light guide grooves 7 are configured to control an angle α between a normal line and light which is emitted into the light guide plate 1 from the light sources 2 through the light guide grooves 7 to be in a range from $\arcsin(n_0/n_2)$ to $\arcsin(n_1/n_2)$, where $n_0$ is a refractive index of air, $n_1$ is a refractive index of liquid on a surface of an object contacting the light guide plate 1, and $n_2$ is a refractive index of the light guide plate. The range of the angle α is derived according to the law of refraction. In a case that $n_0=1.0$, $n_1=1.33$ and $n_2=1.5$, the angle α is in a range from 41.8 degrees to 62.5 degrees. In this embodiment, a is selected to be 45 degrees. The benefit of such a design is that: when no finger and palm touches the light guide plate 1, the light in the range of the angle which is emitted from the light source 2 into the light guide plate 1 can propagate laterally through total internal reflection in light guide plate 1 (referring to a schematic diagram of an optical path of total internal reflection shown in FIG. 2); and when a finger or palm touches the light guide plate 1, the total internal reflection of the light in the light guide plate 1 is frustrated, and thus the light is diffused. The light diffused passes through the dense vias 4 to form an image on the image sensor 5.

Figure 3:
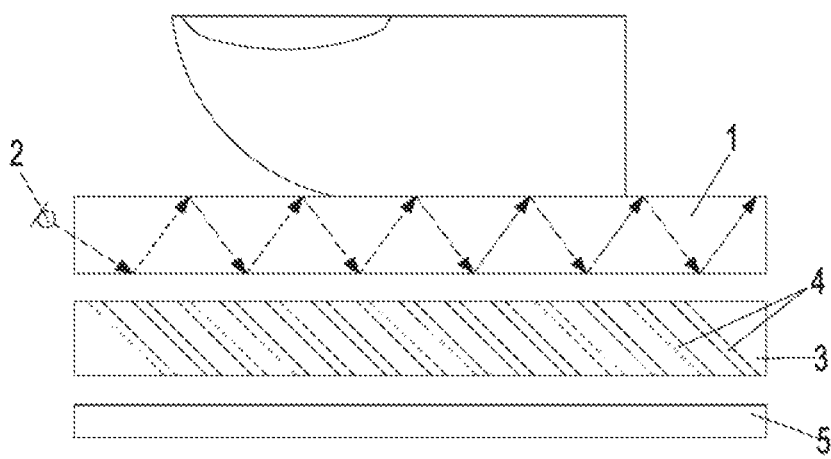
FIG. 3 is a schematic diagram of an image collector according to a third embodiment of the present disclosure.

FIG. 3 shows a schematic diagram of a fingerprint and palmprint image collector with a honeycomb structure according to a third embodiment of the present disclosure, and most of the structure thereof is the same as that in the embodiment shown in FIG. 1. The difference is that, the image sensor 5 is disposed below the honeycomb plate 3 and spaced apart from the honeycomb plate 3. The central axis of the via 4 on the honeycomb plate 3 inclines to the lower right. An angle between the central axis of the via and a horizontal plane is greater than or equal to 30 degrees. In this embodiment, the angle is selected to be 45 degrees. The vias 4 are parallel to each other.

With such a design, when a finger or a palm is touching the light guide plate 1, the total internal reflection of light inside the light guide plate 1 is frustrated. Part of the light is projected onto the surface of the finger or palm leaking from the light guide plate 1 to form light diffused in various angles. Only the light parallel to or approximately parallel to the vias 4, that is, the light inclining to the lower left with an inclination angle of 45 degrees or approximately 45 degrees, can be projected on the image sensor 5 through the vias 4, thus effectively reducing the interference of external stray light. For the fingerprint or palmprint with the valley structure, the parallel light is used to facilitate acquisition of a high-contrast image.

Figure 4:
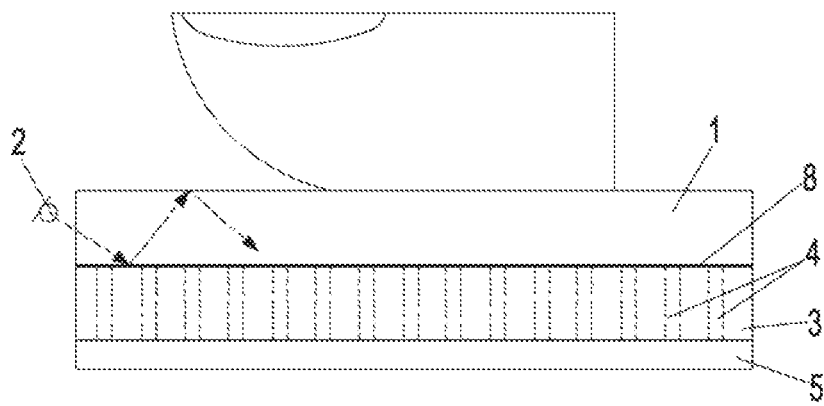
FIG. 4 is a schematic diagram of an image collector according to a fourth embodiment of the present disclosure.

FIG. 4 shows a schematic diagram of a fingerprint and palmprint image collector with a honeycomb structure according to a fourth embodiment of the present disclosure, and most of the structure thereof is the same as that in the embodiment shown in FIG. 1. The difference is that, the light guide plate 1 is disposed on the upper surface of the honeycomb plate 3, and a diffuse reflection layer 8 is bonded on the upper surface of the honeycomb plate 3. The diffuse reflection layer 8 is formed by doping diffuse reflective particles into transparent gel. The diffuse reflection layer 8 is configured to further frustrate the total internal reflection of light inside the light guide plate 1 and form the light diffused upward. Thus, in one aspect, the light propagates through total internal reflection in the light guide plate 1, and in another aspect, diffused illumination is formed. This is similar to an implementation way of an area light source. The light diffused is projected on the surface of the finger or palm, and part of parallel light is reflected from the surface of the finger or palm and passes through the dense vias 4 for imaging. In acquisition of the fingerprint or palmprint, the problem of dry finger is effectively solved and a clear fingerprint image is obtained by using diffused illumination in combination with parallel light imaging.

Figure 5:
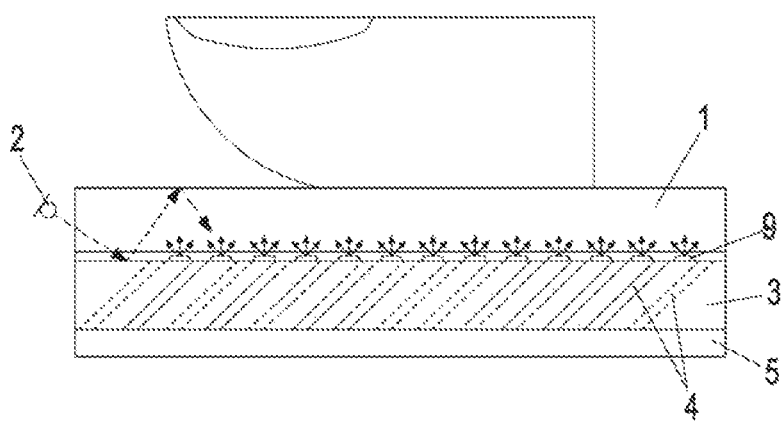
FIG. 5 is a schematic diagram of an image collector according to a fifth embodiment of the present disclosure.

FIG. 5 shows a schematic diagram of a fingerprint and palmprint image collector with a honeycomb structure according to a fifth embodiment of the present disclosure, and most of the structure thereof is the same as that in the embodiment shown in FIG. 4. The difference is that, the central axis of the via 4 on the honeycomb plate 3 inclines to the lower left, and an angle between the central axis of the via and a horizontal plane is greater than or equal to 30 degrees and less than or equal to 90 degrees. In this embodiment, the angle is selected to be 45 degrees. The vias 4 are parallel to each other. The diffuse reflection layer 8 on the upper surface of the honeycomb plate 3 is composed of a convex structure 9 disposed between adjacent vias 4. The convex structure 9 is configured to further frustrate the total internal reflection of light inside the light guide plate 1 and form the light diffused upward. In one aspect, the light propagates through total internal reflection in the light guide plate 1. In another aspect, the light diffused is projected on the surface of the finger, and part of parallel light is reflected from the surface of the finger and passes through the dense vias 4 for imaging.

As shown in FIG. 1 to FIG. 5, the honeycomb plate is disposed below the light guide plate. The plurality of vias on the honeycomb plate penetrate the upper surface and the lower surface of the honeycomb plate, and the central axes of the plurality of vias are parallel to each other. The diameter of the via is in a range from 0.5 micrometer to 50 micrometers, and the thickness of the honeycomb plate is more than five times the diameter of the via. The central axis of the via 4 is perpendicular to a horizontal plane of the honeycomb plate (that is, the upper surface or the lower surface of the honeycomb plate), or the central axis of the via 4 inclines to the left or right with respect to the horizontal plane of the honeycomb plate, with an inclination angle being greater than or equal to 30 degrees and less than or equal to 90 degrees.

In a specific implemented structure of the honeycomb plate, the distance between centers of the adjacent vias on the honeycomb plate is less than or equal to 50.8 micrometers. When the distance between centers of the adjacent vias 4 is selected to be 50.8 micrometers, an image collector with such vias 4 disposed densely may meet the requirement for resolution 500 PPI. When the distance between centers of the adjacent vias 4 is selected to be 25.4 micrometers, the image collector may meet the requirement for resolution 1000 PPI. When the distance between centers of the adjacent vias 4 is selected to be 12.7 micrometers, the image collector may meet the requirement for resolution 2000 PPI. Therefore, those skilled in the art may adjust the distance between centers of the vias based on a predetermined resolution, after knowing the above proportional relationship between the distance between centers of the vias and the resolution of the image collector.

Figure 6:
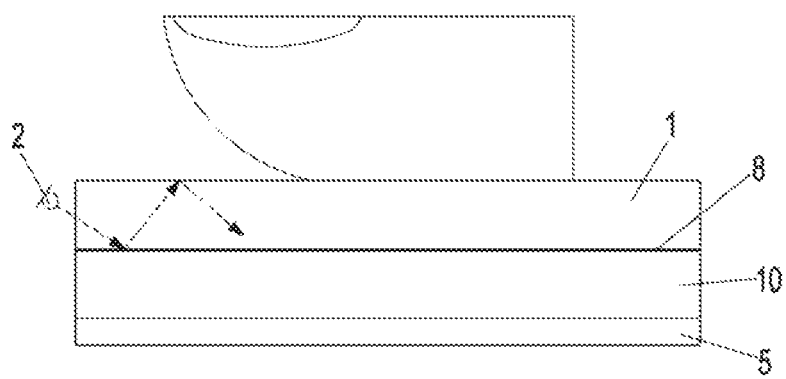
FIG. 6 is a schematic diagram of an image collector according to a sixth embodiment of the present disclosure.

FIG. 6 shows a schematic diagram of a fingerprint and palmprint image collector with a honeycomb structure according to a sixth embodiment of the present disclosure, and most of the structure thereof is the same as that in any one of the embodiments shown in FIG. 1 to FIG. 5. The difference is that, the honeycomb plate 3 is replaced by an optical fiber plate 10. The optical fiber plate 10 is formed by a plurality of optical fibers parallel to each other and disposed densely in a bonding mode. One end of the optical fibers is toward the light guide plate 1, and the other end of the optical fibers is toward the image sensor 5. Each of the optical fibers transmits independently a pixel from one end to the other end of the optical fiber and finally to the image sensor 5, without interference among the optical fibers. These dense pixels are combined on the image sensor to form a fingerprint or palmprint image.

Other structures in this embodiment are the same as those in the embodiment shown in FIG. 4, and the principle of acquiring images in this embodiment is the same as the principle of honeycomb plate in the above embodiments. The technique of acquiring images with an optical fiber plate has been used, which is not repeated herein.

Figure 7:
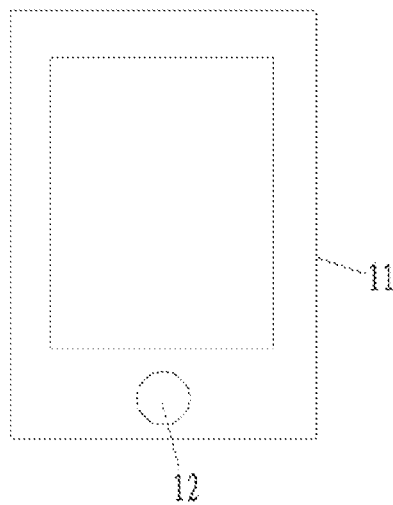
FIG. 7 is a schematic diagram of a terminal device according to a first embodiment of the present disclosure.

The above-described fingerprint and palmprint image collectors with the honeycomb structure may be applied to various terminal devices. In practice, the image collector may be an individual module to collect a fingerprint or palmprint. FIG. 7 shows a schematic diagram of a terminal device according to a first embodiment of the present disclosure. The image collector 12 shown in any one of FIG. 1 to FIG. 6 is disposed on a terminal device 11. The image collector 12 is disposed on an edge of the terminal device 11. The terminal device 11 may be a mobile phone, and the image collector 12 may be disposed on the HOME key of the mobile phone. The terminal device 11 has an additional fingerprint and palmprint acquisition function by adding fewer additional components with low cost.

Figure 8:
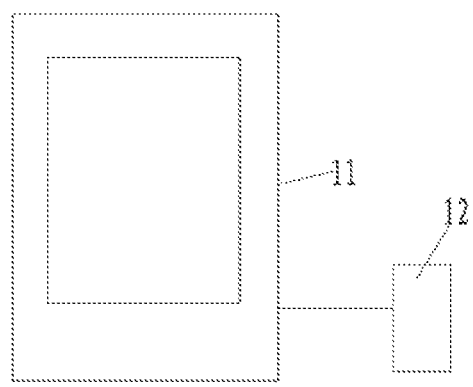
FIG. 8 is a schematic diagram of a terminal device according to a second embodiment of the present disclosure.

FIG. 8 shows a schematic diagram of a terminal device according to a second embodiment of the present disclosure, which includes the image collector 12 as shown in any one of FIG. 1 to FIG. 6. The image collector 12 is an individual device, and is connected to the terminal device 11 via a wire and an interface.

Other implementations of the invention may be easily envisaged by one skilled in the art after considering the specification and practicing the invention disclosed herein. This application intends to cover any variations, usage or adaptive changes of the invention, which comply with the general principles of the invention and include common knowledge or conventional technical means in the art that are not disclosed. The specification and embodiments are exemplary only, and the true scope and spirit of the invention are defined by the claims.

It should be understood that, the invention is not limited to precise structures described above and shown in the drawings, and various modifications and variations may be made without departing from the scope thereof. Therefore, the scope of the invention is only defined by the claims appended.

What is claimed is:

1. A fingerprint and palmprint image collector with a honeycomb structure, comprising:
a light guide plate and a light source for emitting at least part of light into the light guide plate, wherein a honeycomb plate is disposed at one surface of the light guide plate, a plurality of vias parallel to each other are densely disposed on the honeycomb plate, diameters of the plurality of vias are in a range from 0.5 micrometer to 50 micrometers, a size of an acquired fingerprint and palmprint is equal to a size of an acquired image, a thickness of the honeycomb plate is more than five times the diameters of the vias, a distance between centers of adjacent vias is less than or equal to 50.8 micrometers, and an image sensor is disposed on the other surface of the honeycomb plate,
wherein, the light source is fixed on the light guide plate through a support which is provided with a light guide groove, and the light source is disposed in the light guide groove, wherein the light guide groove is configured to control an angle between a normal line and light emitted into the light guide plate from the light source through the light guide groove to be in a range from $\arcsin(n_0/n_2)$ to $\arcsin(n_1/n_2)$, where $n_0$ refractive index of air, $n_1$ is a refractive index of liquid on a surface of an object contacting the light guide plate, and $n_2$ is a refractive index of the light guide plate.

2. The fingerprint and palmprint image collector with the honeycomb structure according to claim 1, wherein, angles between central axes of the plurality of vias and a horizontal plane of the honeycomb plate are greater than or equal to 30 degrees and less than or equal to 90 degrees.

3. The fingerprint and palmprint image collector with the honeycomb structure according to claim 2, wherein, the light source is disposed at a side and/or an upper surface and/or a lower surface of the light guide plate.

4. The fingerprint and palmprint image collector with the honeycomb structure according to claim 1, wherein, a diffuse reflection layer is disposed on a surface of the honeycomb plate facing the light guide plate.

5. The fingerprint and palmprint image collector with the honeycomb structure according to claim 4, wherein, the diffuse reflection layer is composed of a convex structure disposed between adjacent vias.

6. The fingerprint and palmprint image collector with the honeycomb structure according to claim 5, wherein, the light guide plate and the honeycomb plate are disposed to be spaced apart from each other or connected to each other, and the honeycomb plate and the image sensor are disposed to be spaced apart from each other or connected to each other.

7. The fingerprint and palmprint image collector with the honeycomb structure according to any one of claims 1 to 6, wherein, the honeycomb plate is replaced by an optical fiber plate which is composed of a plurality of optical fibers parallel to each other and disposed densely, wherein one end of the plurality of optical fibers is toward the light guide plate, and the other end of the plurality of optical fibers is toward the image sensor.

8. A terminal device, comprising: the fingerprint and palmprint image collector with the honeycomb structure according to any one of claims 1 to 6.

9. A fingerprint and palmprint image collector with a honeycomb structure, comprising:

a light guide plate, a honeycomb plate and a light source for emitting at least part of light into the light guide plate, wherein the honeycomb plate is disposed below the light guide plate, a plurality of vias parallel to each other are disposed between an upper surface and a lower surface of the honeycomb plate, diameters of the plurality of vias are in a range from 0.5 micrometer to 50 micrometers, a thickness of the honeycomb plate is more than five times the diameters of the vias, and an image sensor is disposed on the lower surface of the honeycomb plate, wherein, the light source is fixed on the light guide plate through a support which is provided with a light guide groove, and the light source is disposed in the light guide groove, wherein the light guide groove is configured to control an angle between a normal line and light emitted into the light guide plate from the light source through the light guide groove to be in a range from $\arcsin(n_0/n_2)$ to $\arcsin(n_1/n_2)$, where $n_0$ is a refractive index of air, $n_1$ is a refractive index of liquid on a surface of an object contacting the light guide plate, and $n_2$ is a refractive index of the light guide plate.

10. A terminal device, comprising: the fingerprint and palmprint image collector with the honeycomb structure according to claim 7.

* * * * *